US012304223B2

(12) United States Patent
Matsumoto et al.

(10) Patent No.: US 12,304,223 B2
(45) Date of Patent: May 20, 2025

(54) OPTICAL SCANNING DEVICE, IMAGE FORMING APPARATUS, AND CONTROL METHOD

(71) Applicant: SHARP KABUSHIKI KAISHA, Sakai (JP)

(72) Inventors: Kazutaka Matsumoto, Sakai (JP); Ryotaro Kuroda, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 165 days.

(21) Appl. No.: 17/739,986

(22) Filed: May 9, 2022

(65) Prior Publication Data

US 2022/0382180 A1 Dec. 1, 2022

(30) Foreign Application Priority Data

May 25, 2021 (JP) ................................ 2021-087915

(51) Int. Cl.
*G03G 15/043* (2006.01)
*B41J 2/44* (2006.01)
*B41J 2/45* (2006.01)
*B41J 2/455* (2006.01)
*B41J 2/47* (2006.01)

(52) U.S. Cl.
CPC ................ *B41J 2/47* (2013.01); *B41J 2/442* (2013.01); *B41J 2/45* (2013.01); *B41J 2/455* (2013.01); *B41J 2/471* (2013.01); *B41J 2/473* (2013.01); *G03G 15/043* (2013.01); *G03G 2215/0404* (2013.01)

(58) Field of Classification Search
CPC ......... G03G 15/043; G03G 2215/0404; G03G 15/04; G03G 2215/0402; B41J 2/442; B41J 2/45; B41J 2/455; B41J 2/473; B41J 2/44; B41J 2/447; B41J 2/47; B41J 2/471
See application file for complete search history.

(56) References Cited

U.S. PATENT DOCUMENTS

2004/0188717 A1* 9/2004 Ono ........................ B41J 2/471 257/200
2011/0032323 A1* 2/2011 Yamashita ......... H04N 1/40056 347/246
2017/0139342 A1* 5/2017 Seki .................. H04N 1/00904

FOREIGN PATENT DOCUMENTS

JP H09272223 A 10/1997
JP 2000187374 A 7/2000
JP 2002127499 A * 5/2002

(Continued)

*Primary Examiner* — Justin Seo
*Assistant Examiner* — Kendrick X Liu
(74) *Attorney, Agent, or Firm* — ScienBiziP, P.C.

(57) ABSTRACT

An optical scanning device includes a laser driver, an offset value determiner, a bias current setter, and a laser driver controller. The laser driver controls a laser light emitter to increase or decrease an excess of a current over a bias current in response to an input analog signal. The offset value determiner determines an offset value of the analog signal input to the laser driver based on a target light quantity of the laser light emitter. The bias current setter controls the bias current of the laser driver to a setting value in accordance with laser characteristics or lens transmittance of the laser light emitter. The laser driver controller controls a light emission quantity of the laser light emitter by inputting, to the laser driver, the analog signal offset based on a signal of the determined offset value.

7 Claims, 13 Drawing Sheets

(56) References Cited

FOREIGN PATENT DOCUMENTS

| | | | |
|---|---|---|---|
| JP | 2008012852 | A | 1/2008 |
| JP | 2018-069518 | A | 5/2018 |

* cited by examiner

FIG. 4

| Vref (dec) | Voffset (dec) |
|---|---|
| 0 | 255 |
| 1 | 255 |
| : | : |
| 20 | 254 |
| : | : |
| 128 | 92 |
| : | : |
| 160 | 65 |
| : | : |
| 255 | 64 |

OPTICAL SCANNING DEVICE, IMAGE FORMING APPARATUS, AND CONTROL METHOD

BACKGROUND OF THE INVENTION

Field of the Invention

The present disclosure relates to an optical scanning device, etc.

Description of the Background Art

An image forming apparatus is equipped with an optical scanning device that scans the photoreceptor drum or a scanned object with a laser beam emitted by a laser diode (light emitting element) for the exposure process of forming an electrostatic latent image on the surface of the photoreceptor drum in the process of forming an image based on an image signal on a recording paper (sheet-like image recording medium).

In general, a laser diode has a characteristic in that an optical output rises at the threshold current as an input current is increased. Conventionally, a bias current flows through the laser diode continuously in order to reduce delay at a rising time to shorten the rising time of a laser oscillation.

As a laser driver for driving a laser diode, a laser driver is known that supplies a predetermined bias current below a threshold in standby mode, and when the laser diode is driven, the current in an excess of a current over the bias current is increased or decreased in proportion to the analog input signal. Alternatively, there is a known auto-bias control process that matches the bias current to the threshold during standby.

Japanese Unexamined Patent Publication No. 2018-69518 discloses an optical scanning device related to a laser driver with a fixed bias current that does not have the function of executing the auto-bias control process; the optical scanning device saves the characteristics of the laser diode light quantity and current (PI characteristics) for each temperature, and then calculates the current value of the analog signal that controls the laser driver in accordance with a target light quantity.

However, Japanese Unexamined Patent Publication No. 2018-69518 has the following issues because the PI characteristics of the laser are stored for each temperature, and then the voltage setting value of the analog signal is calculated in accordance with the target light quantity.

Processing requires time to repeatedly calculate the voltage setting value in accordance with changes in the target light quantity due to environment correction and aging correction, or the like.

When shading is carried out at a low target light quantity level, resolution of the shading is degraded. When the PI characteristics and an original light quantity of the laser vary independently, optical displacement occurs in the target light quantity.

To address the above problem, it is conceivable to apply a batch offset to the analog signal in accordance with the target light quantity. However, if only a uniform offset value is set, defects in laser light emission quantity may occur due to variations in laser characteristics or lens transmittance.

In view of this situation, the present disclosure seeks to provide an optical scanning device, etc. that can appropriately control the laser light emission quantity according to the laser characteristics and lens transmittance when offsetting the analog signal to be input to the laser driver based on the target light quantity of the laser light emitter.

SUMMARY OF THE INVENTION

An optical scanning device according to the disclosure includes a laser driver that controls a laser light emitter to increase or decrease an excess of a current over a bias current in response to an input analog signal; an offset value determiner that determines an offset value of the analog signal input to the laser driver based on a target light quantity of the laser light emitter; a bias current setter that controls the bias current of the laser driver to a setting value corresponding to laser characteristics or lens transmittance of the laser light emitter; and a laser driver controller that controls a light emission quantity of the laser light emitter by inputting, to the laser driver, the analog signal offset based on a signal of the determined offset value. Another optical scanning device according to the disclosure includes a laser driver that controls a laser light emitter to increase or decrease an excess of a current over a bias current in response to an input analog signal; an offset value determiner that determines an offset value of the analog signal input to the laser driver based on a target light quantity of the laser light emitter; a laser driver controller that controls a light emission quantity of the laser light emitter by inputting, to the laser driver, the analog signal offset based on a signal of the determined offset value, wherein, the laser light emitter comprises a multibeam laser light emitter including a plurality of laser light emitting elements emitting laser beams, and the laser driver controller individually sets, in the laser driver, a shading correction signal for shading correction of a laser beam scanned on an object, for each of the laser light emitting elements of the multibeam laser light emitter, and sets a signal of a common offset value for the plurality of laser light emitting elements.

An image forming apparatus according to the disclosure includes the optical scanning device described above; an image carrier having a surface on which an electrostatic latent image is formed by scanning a laser beam emitted from the laser light emitter; and a developing section that develops the electrostatic latent image formed on the surface of the image carrier.

A method of controlling an optical scanning device according to the disclosure includes a laser driver that controls a laser light emitter to increase or decrease an excess of a current over a bias current in response to an input analog signal, the method including: determining an offset value of the analog signal input to the laser driver based on a target light quantity of the laser light emitter; setting the bias current in accordance with laser characteristics or lens transmittance of the laser light emitter; and controlling a light emission quantity of the laser light emitter by inputting, to the laser driver, the analog signal offset based on a signal of the determined offset value while the bias current has been set.

According to the optical scanning device, etc. of the present invention, since the light emission quantity of the laser light emitter is controlled by inputting, to a laser driver, an analog signal offset on the basis of a signal of the offset value in a state where a bias current is set in accordance with the laser characteristic or the lens transmittance of the laser light emitter, the excellent effects are achieved that the required offset amount is secured, the resolution when the target light quantity is large is secured, and deviation of the target light quantity does not occur.

BRIEF DESCRIPTION OF THE DRAWINGS

FIG. 4 is a diagram illustrating an offset value table.

FIG. 6A illustrates a detection signal of a BD sensor, FIG. 6B illustrates a shading correction value signal, FIG. 6C illustrates a signal of an offset value, and FIG. 6D illustrates a signal input to the laser driver.

FIG. 11A illustrates the case where the offset becomes large, FIG. 11B illustrates the case where the offset becomes small, FIGS. 11C and 11D illustrate correction images.

DESCRIPTION OF THE PREFERRED EMBODIMENTS

Embodiments of the disclosure will now be described with reference to the accompanying drawings.

Note that the following embodiments are examples for describing the disclosure, and thus the technical scope of the invention stated in the claims is not limited to the following description.

1. Embodiment

Figure 1:
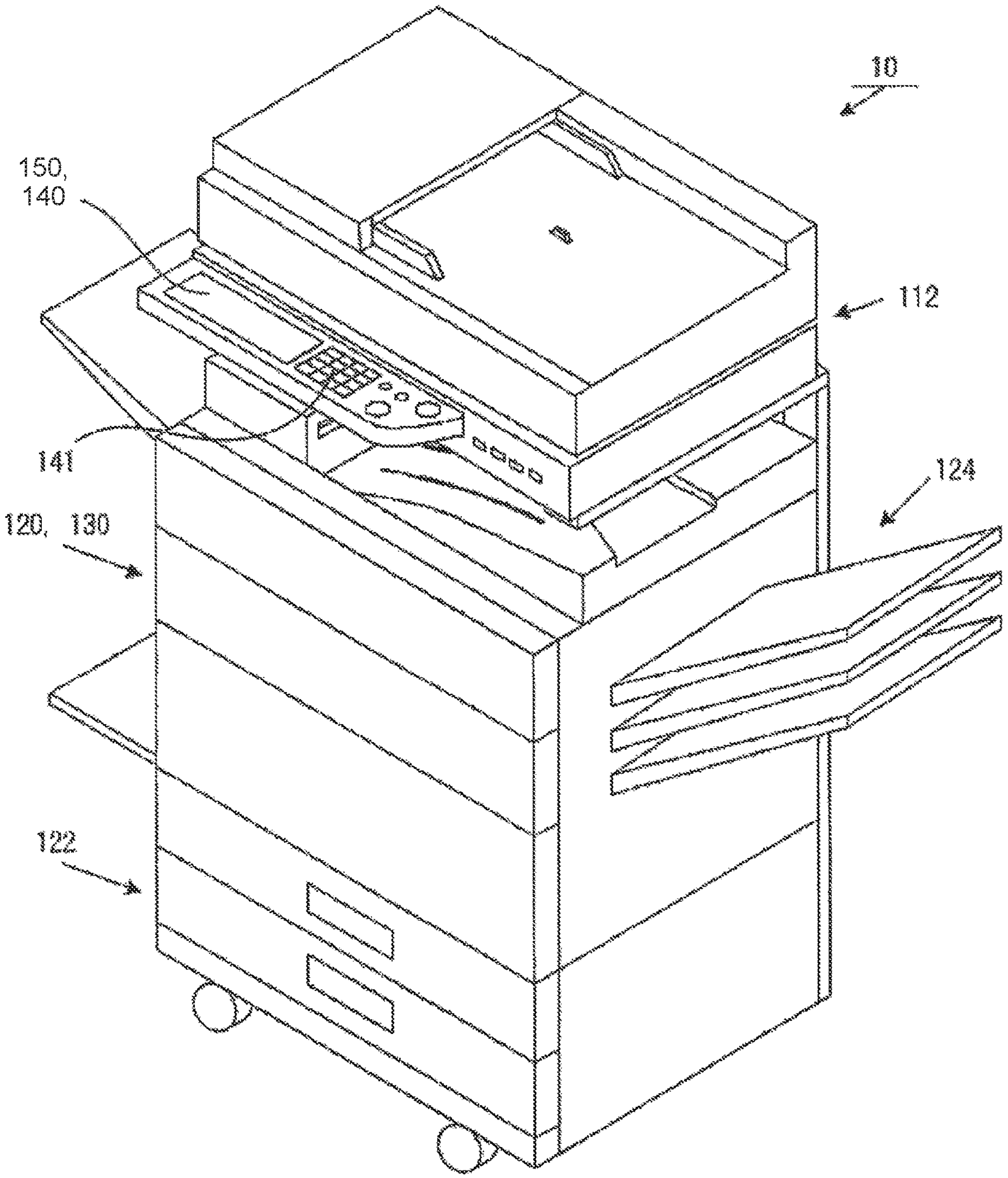
FIG. 1 is an external view of an image forming apparatus equipped with an optical scanning device according to a first embodiment.
Figure 2:
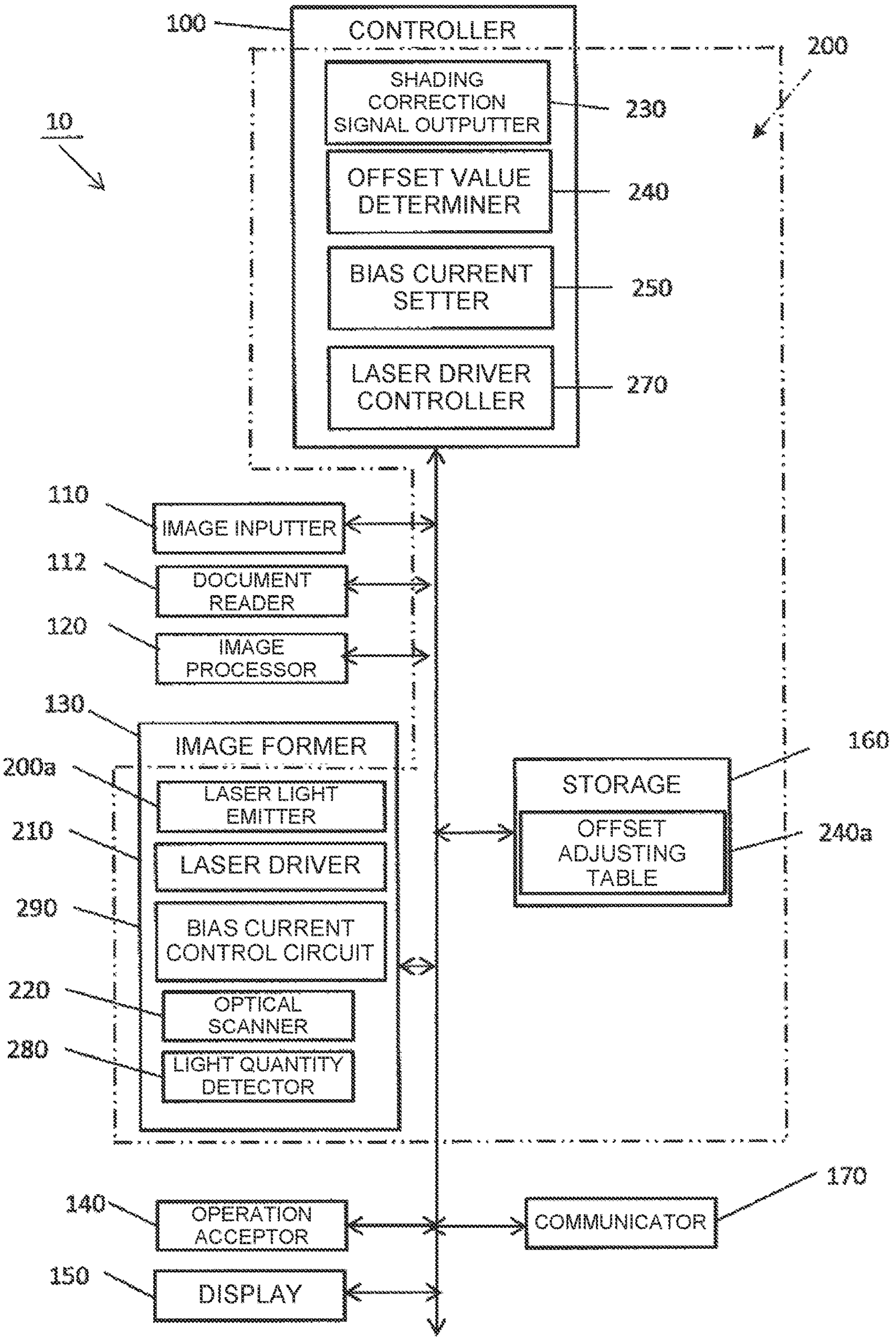
FIG. 2 is a control block diagram of the image forming apparatus and the optical scanning device.

The configuration of an image forming apparatus 10 according to the present embodiment will now be described. FIG. 1 is an external diagram of the image forming apparatus 10 equipped with an optical scanning device 200 according to the present embodiment. FIG. 2 is a control block diagram of the image forming apparatus 10 and the optical scanning device 200.

1.1 Overall Configuration

As illustrated in FIG. 1, the image forming apparatus 10 is an information processing apparatus that includes a document reader 112 on the upper side of the image forming apparatus 10 to read an image of a document and outputs the image using an electrophotographic method. An example of an image forming apparatus 10 can include a multifunction printer.

As illustrated in the control system diagram in FIG. 2, the image forming apparatus 10 mainly includes a controller 100, an image inputter 110, a document reader 112, an image processor 120, an image former 130, an operation acceptor 140, a display 150, a storage 160, and a communicator 170, and has a function of the optical scanning device 200.

1.2 Image Forming Apparatus 10

The controller 100 is a functional element that comprehensively controls the image forming apparatus 10.

The controller 100 realizes various functions by reading and executing various programs, and is composed of, for example, one or more arithmetic devices (e.g., a central processing unit (CPU)).

The image inputter 110 is a functional part for reading image data input to the image forming apparatus 10. Moreover, the image inputter 110 is connected to the document reader 112 being a functional element that reads an image in a document, and receives image data output from the document reader 112.

Alternatively, the image inputter 110 may receive image data from a storage medium, such as a USB memory or an SD card. Alternatively, the image inputter may receive image data from other terminal devices via the communicator 170 connected to such terminal devices.

The document reader 112 has a function of optically reading a document placed on a contact glass (not illustrated) and feeding the scanned data to the image processor 120.

The image former 130 is a functional element for forming output data based on the image data on a recording medium (e.g., recording paper). For example, as illustrated in FIG. 1, the recording paper is fed from a paper feed tray 122, and after an image is formed on the surface of the recording paper in the image former 130, the recording paper is output to a paper discharge tray 124. The image former 130 includes a laser printer employing an electrophotographic process using an electrophotographic method.

The electrophotographic process of the image former 130 includes scanning a laser beam (corresponding to laser light) corresponding to the image data on the surface of a photoreceptor drum (image carrier) 130*a* (see FIG. 5) by the optical scanning device 200 described below to form an electrostatic latent image, developing the electrostatic latent image with toner, and transferring and fusing the developed toner image onto a recording medium to form an image. That is, the image former 130 may be configured to include at least a developing section that develops the electrostatic latent image formed on the surface of the image carrier.

The image processor 120 has a function to convert the image data into a set file format (e.g., TIFF, GIF, or JPEG) on the basis of the image data read by the document reader 112. The output image is then formed on the basis of the image data subjected to image processing.

The operation acceptor 140 is a functional element for receiving operation instructions by a user, and is composed of various key switches, a device for detecting input by a touch, and the like. The user uses the operation acceptor 140 to input a function to be used and an output condition.

The display 150 is a functional element for displaying various kinds of information to the user, and is composed of, for example, a liquid crystal display (LCD).

Namely, the operation acceptor 140 provides a user interface for operating the image forming apparatus 10, and the display 150 displays various setting menu screens and messages of the image forming apparatus.

As illustrated in FIG. 1, the image forming apparatus 10 may include a Touch Panel as the operation acceptor 140 in which an operation panel 141 and the display 150 are integrally arranged. In such a case, the method of detecting an input on the Touch Panel may be any common detection method such as a resistive method, an infrared method, an electromagnetic induction method, and an electrostatic capacitive method.

The storage 160 is a functional element for storing various programs including a control program necessary for the operation of the image forming apparatus 10, various kinds of data including reading data, and user information. The storage 160 includes, for example, a non-volatile read only memory (ROM), a random access memory (RAM), or a hard disk drive (HDD). Alternatively, the storage 160 may include a solid state drive (SSD), which is a semiconductor memory.

The communicator 170 can communicate with an external device. A communication interface (communication I/F) used for sending and receiving data is provided as the communicator 170. In response to an operation of the image forming apparatus 10 by a user, the communication I/F allows data stored in the storage of the image forming apparatus 10 to be sent to and received from any other computer device connected via a network.

1.3 Optical Scanning Device 200

Figure 3:
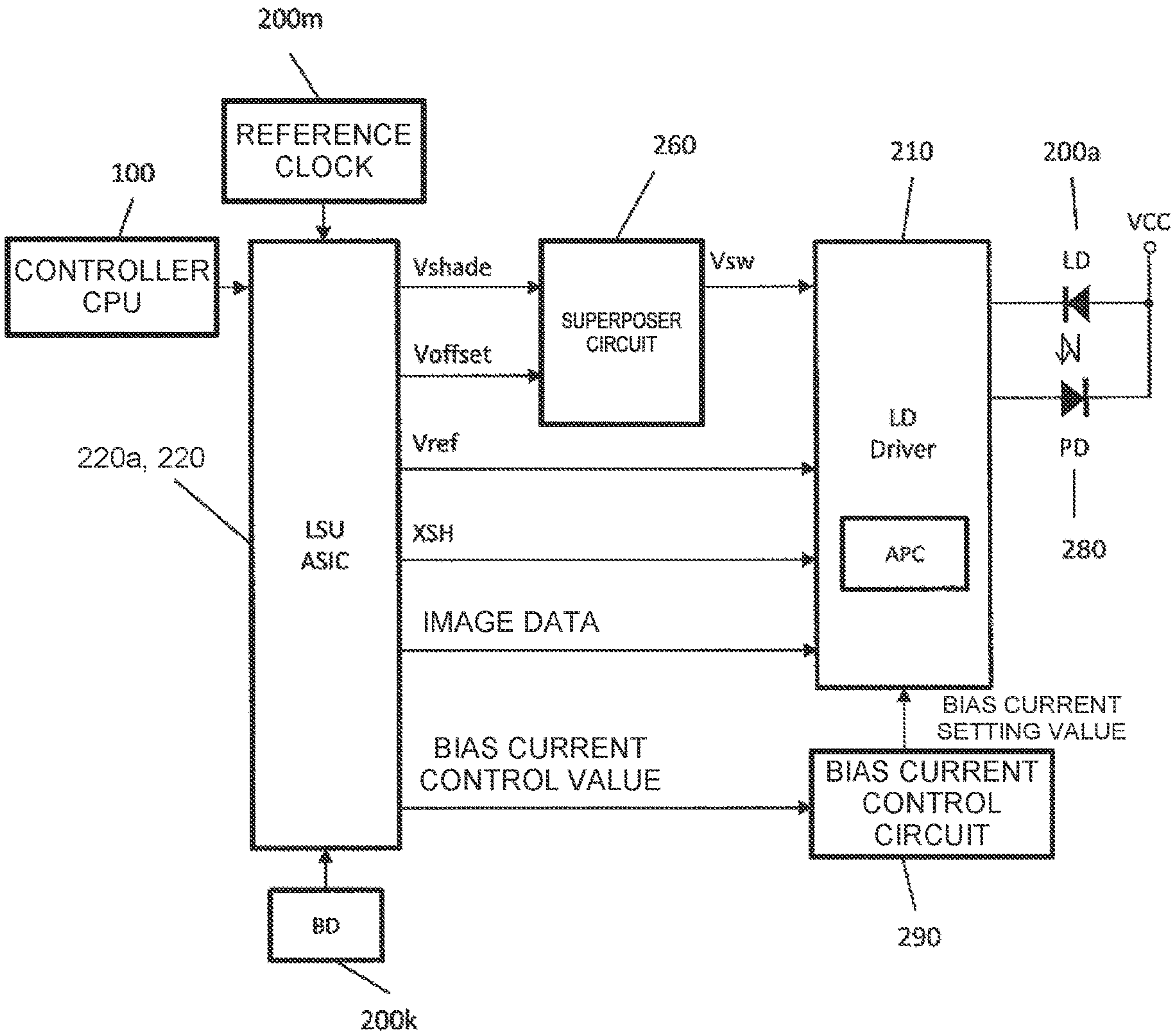
FIG. 3 is a circuit diagram of a signal flow path of a laser light emitter and a laser driver of the optical scanning device.

As illustrated in FIG. 2, the optical scanning device 200 is mounted on the image forming apparatus 10. FIG. 3 illustrates a specific circuit diagram of the signal flow path the laser driver and the vicinity in the optical scanning device 200.

As illustrated in FIGS. 2 and 3, the optical scanning device 200 includes a laser light emitter 200*a*, a laser driver 210, an optical scanner 220, a shading correction signal outputter 230, an offset value determiner 240, a bias current setter 250, a superposer (superposition circuit) 260, and a laser driver controller 270. The laser light emitter 200*a* is composed of a laser light emitting element (semiconductor laser element). The laser driver 210 controls the laser light emitter (laser device (LD)) 200*a* so that the excess of a current over a bias current is increased or decreased in proportion to an input analog signal. The optical scanner 220 scans a photoreceptor drum 130*a* being an object with a laser beam (laser light) output from the laser light emitter 200*a*. The shading correction signal outputter 230 outputs a shading correction value signal (Vshade) for making a shading correction on a light scanning the object. The offset value determiner 240 determines an offset value of the analog signal input to the laser driver 210 on the basis of a target light quantity (Vref) of the laser light emitter 200*a*. The bias current setter 250 sets a bias current to the laser driver 210 in accordance with the laser characteristics or the lens transmittance of the laser light emitter 200*a*. The superposer 260 superposes the determined offset value signal (Voffset) on the analog signal (the offset value signal (Voffset) of the shading correction value signal) and offset it. The laser driver controller 270 controls the light emission quantity of the laser light emitter (LD) 200*a* by inputting a shading correction signal (Vsw) of an analog signal offset due to superposition, to the laser driver (LD Driver) 210, while the bias current has been set. Note that in FIG. 3, Vcc denotes a power supply voltage.

The laser light emitter 200*a* includes one or more laser light emitting elements (semiconductor laser elements, such as laser diodes), and detects the output light quantity by a light quantity detector 280 including a photodiode (PD).

The bias current setter 250 outputs a setting value of the bias current of the laser light emitter 200*a*. The setting value is input to a bias current control circuit 290 via a laser scanning unit 220*a* as a control signal corresponding to a bias current control value. The bias current control circuit 290 controls the bias current of the laser driver 210 to correspond to the setting value.

The shading correction value signal (Vshade) output by the shading correction signal outputter 230 is calculated in an adjustment process of the optical scanning device 200 and stored in a ROM or the like of the storage 160. The shading correction values are sequentially read out from the storage 160 in accordance with an irradiation position of the laser beam on the surface of the photoreceptor drum 130*a* in a main scanning direction.

As illustrated in FIG. 3, the optical scanner 220 of the optical scanning device 200 includes a laser scanning unit (LSU) 220*a* as a control system. The laser scanning unit inputs the signals output from the shading correction signal outputter 230, the offset value determiner 240, and the bias current setter 250 in response to a control signal from the controller 100 to the laser driver 210, and is composed of an application-specific integrated circuit (LSUASIC). A reference clock signal 200*m* and a detection signal of a BD sensor 200*k* are input to the integrated circuit (LSUASIC) of the laser scanning unit 220*a*.

The shading correction value signal (Vshade) output by the shading correction signal outputter 230 is obtained in advance by experiments or the like, and stored in the ROM or the like of the storage 160. The shading correction value signal (Vshade) is an analog voltage signal. In response to an input of the shading correction value signal, the laser driver 210 controls an excess of a current over the bias current of the laser light emitter 200*a* so as to be proportional to the input signal. The shading correction values are sequentially read from the storage 160 in accordance with the irradiation position of the laser beam on the surface of the photoreceptor drum 130*a* in the main scanning direction on basis of the detection signal of the BD sensor 200*k*.

The offset value signal (Voffset) output by the offset value determiner 240 is an analog voltage signal. The signal is a voltage signal for a shading ratio correction and corresponds to the difference between the bias current and the threshold current of the laser light emitter 200*a*.

The laser light emitter 200*a* is a component in which the laser driver controller 270 and the laser scanning unit 220*a* controls (automatic power control (APC) described below) the light emission quantity of the laser light emitter 200*a* to a target light quantity on the basis of the light emission quantity of the laser light emitter 200*a* detected by the light quantity detector 280.

Specifically, the target light quantity signal is controlled in accordance with the reference voltage (Vref) in a sub-scanning direction. The reference voltage signal (Vref) is input to the laser driver 210 to become the reference voltage of the APC. The laser driver 210 controls the current of the laser light emitter 200*a* so that the quantity of the emitted light is proportional to the reference voltage signal (Vref).

The light quantity detector 280 includes, for example, a photodiode (PD) of a light quantity detection element disposed near the laser light emitting element of the laser light emitter 200*a*. The laser driver controller 270 employs the APC control method in which the laser driver controller 270 monitors an optical output (light power) P of the laser light emitter 200*a* detected by the light quantity detector 280, and automatically controls a drive current of the laser light emitter 200*a* so that the optical output becomes equal to the target light quantity that is a constant value corresponding to a level of the reference voltage signal (Vref).

Note that the APC has an initial APC and a stationary APC. The initial APC indicates a lighting mode that is performed at the initialization of the laser light emitting element, and is referred to as initialization or 1st APC. The stationary APC is an APC performed for each line scan, and is referred to as line APC or APC simply.

In FIG. 3, the signal XSH output from the control system (laser scanning unit 220*a*) of the optical scanner 220 is a signal for APC, and the APC is performed when the XSH signal is enabled (low). The image data is output to the laser driver 210, which causes an electrostatic latent image corresponding to the image data to be formed on the photoreceptor drum 130*a*.

The detection signal of the BD sensor 200*k* is used so that monitoring and synchronous detection at the stationary APC are generally performed at the same time. The shading correction value signal (Vshade) and the offset value signal (Voffset) superposed in the superposition circuit 260 to obtain an analog signal (Vsw) with the shading correction signal offset is input to the laser driver 210.

The optical scanning device 200 includes a light quantity detector 280 that detects the quantity of light emitted from the laser light emitter 200*a*. The laser driver controller 270 employs an APC control method that controls the drive current of the laser diode by a reference voltage signal (Vref) so that the light emission quantity of the laser light emitter 200*a* becomes target light quantity of the laser light emitter 200*a* detected by the light quantity detector 280.

The offset value determiner 240 determines an offset value (signal Voffset) on the basis of a target light quantity signal (reference voltage signal (Vref)) of the laser driver controller 270 during the APC control. The storage 160 stores an offset adjusting table 240*a* in which a relationship between the target light quantities and the offset values is preset. The offset value determiner 240 determines an offset value based on the target light intensity with reference to the stored offset adjusting table 240*a*.

As illustrated in FIG. 4, in an embodiment, an example of the offset adjusting table 240*a* is stored in a read only memory (ROM) of the storage 160. The offset adjusting table 240*a* sets a relationship between target light quantity signals (reference voltage signal (Vref)) and offset value signals (signal Voffset).

By storing the offset adjusting table 240*a* in the storage 160 in advance, it is not necessary to recalculate the setting value of the analog signal to be input to the laser driver 210 in accordance with changes in the target light quantity due to environmental correction, aging correction, or the like, to make the time required for a process shorter.

In order to address the issue of an offset value signal (signal Voffset) fluctuation depending on temperature, it is preferred that the storage 160 store a plurality of offset adjusting tables 240*a*.

Figure 5:
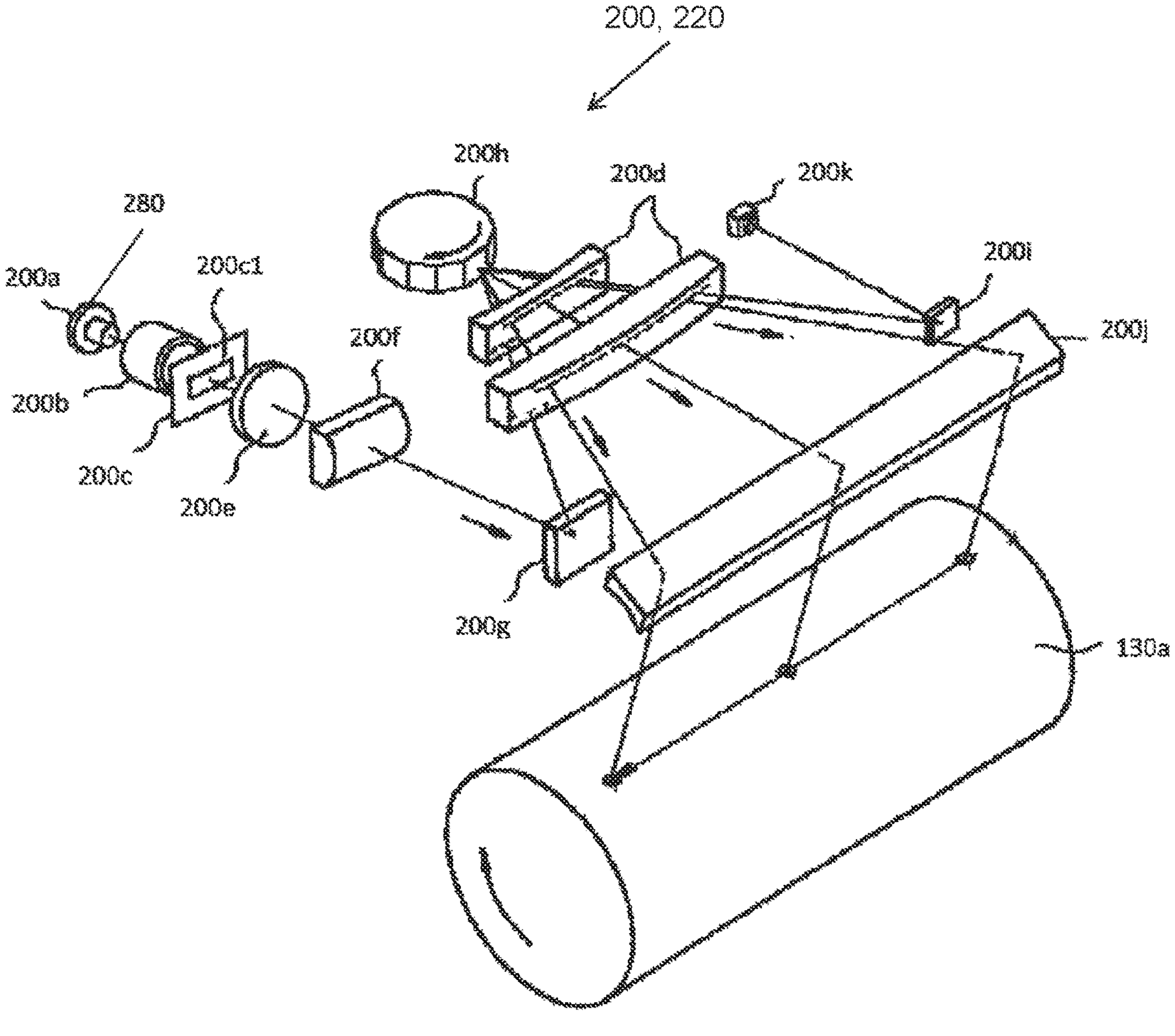
FIG. 5 is a diagram illustrating the mechanical configuration of an optical scanner.
Figure 6A:
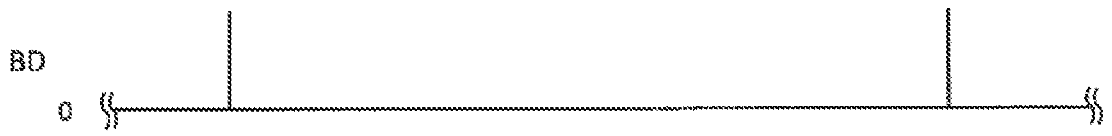
FIGS. 6A to 6D are graphs illustrating signals of the optical scanner, where
Figure 6B:
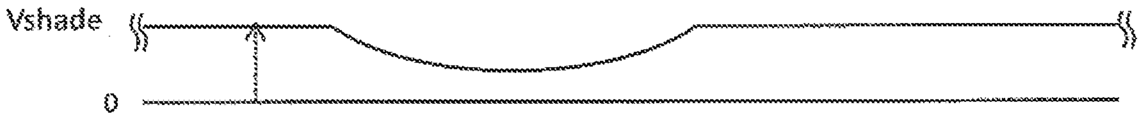
Figure 6C:
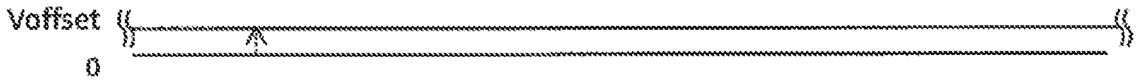
Figure 6D:
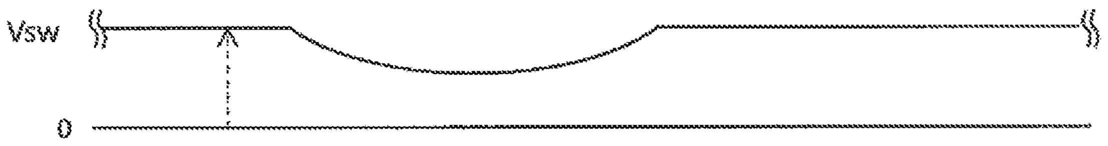

FIG. 5 illustrates a mechanical configuration of the optical scanner 220 of the optical scanning device 200.

As illustrated in FIG. 5, the optical scanner 220 scans the surface of the photoreceptor drum 130*a* with the laser beam to form the electrostatic latent image on the photoreceptor drum 130*a*.

As illustrated in FIG. 5, the optical scanning device 200 includes the laser light emitter 200*a* or laser light emitting element that generates a laser beam (laser light); a collimator lens 200*b* that converts the incident laser beam into a parallel beam; an aperture 200*c* composed of a plate-shaped member that has an aperture 200*c*1 in a substantially center thereof, a concave lens 200*e* that expands the incident laser beam in combination with a fθ lens 200*d*, which expands the laser beam in a scanning direction as described below; a cylindrical lens 200*f*; and an incident beam reflection mirror 200*g*. The components are sequentially arranged in a laser beam projection direction of the laser beam emitted from the laser light emitter 200*a*.

In addition, there are arranged, in order in the reflection direction of the laser beam reflected with the incident beam reflection mirror 200*g*, the f0 lens 200*d* and a polygon mirror 200*h* having a plurality of reflecting surfaces on an outer periphery thereof, as well as in order in the reflection direction of the laser beam reflected with the reflection surface of the polygon mirror 200*h*, the fθ lens 200*d*, a reflection mirror 200*i*, an emitted beam reflection mirror 200*j* that makes a plane tilt correction of the polygon mirror 200*h*, and the photoreceptor drum 130*a*.

Finally, a beam detect sensor (BD sensor) 200*k* detects the light reflected with the reflection mirror 200*i*. The BD sensor 200*k* is an optical sensor that can output a detection signal in accordance with the magnitude of the received light quantity of the laser beam. The BD sensor 200*k* has a function of detecting reflected light of the laser beam on the scan starting side of the main scanning area (scanning area along an axial direction of the photoreceptor drum 130*a*), and controls the timing of writing the electrostatic latent image on the photoreceptor drum 130*a*. As illustrated in FIG. 6, the BD sensor 200*k* detection signal is trigger-like.

The laser light emitter 200*a* also includes in the vicinity thereof the light quantity detector 280 equipped with a photodiode (PD) that detects the laser emission amount.

1.4 Control Signal Example

FIG. 6 illustrates an example of the control signal for the optical scanner 220 illustrated in FIG. 3. FIG. 6 illustrates examples of voltage signals, such as a shading correction value signal (Vshade), an offset value signal (Voffset), and an offset shading correction signal (laser driver input signal: Vsw).

In such as case, the shading correction value signal (Vshade) is an analog voltage signal for shading correction. An excess of a current over the bias current is proportional to this voltage.

The offset value signal (Voffset) is a voltage for shading ratio correction and corresponds to the difference between the bias current and the threshold current.

The sub-scanning reference voltage signal (Vref) is the reference voltage for the APC, and the light quantity is proportional to this voltage.

The signal for APC (XSH) executes APC when this signal is enabled (low).

The laser driver input signal (Vsw) indicates the offset shading correction signal.

Each of the abovementioned signals is an analog voltage signal. Note that the BD signal is a detected signal from the laser beam on the start side of the main scanning area detected by the beam detect sensor (BD sensor) 200*k*.

As illustrated in FIG. 6, although the shading correction value signal (Vshade) has a portion close to a zero level, the offset shading correction signal (Vsw), which is obtained by superposing it on the offset value signal (Voffset), is lifted to be away from the zero level. The analog shading correction signal (Vsw) with the signal having been offset is input to the laser driver 210.

As illustrated in FIG. 3, since the bias current of the laser driver 210 is controlled to be set to the setting value, the bias current setter 250 of the optical scanner 220 inputs a bias current control signal to the bias current control circuit 290 via the laser scanning unit 220*a* in response to the setting value signal.

Figure 7:
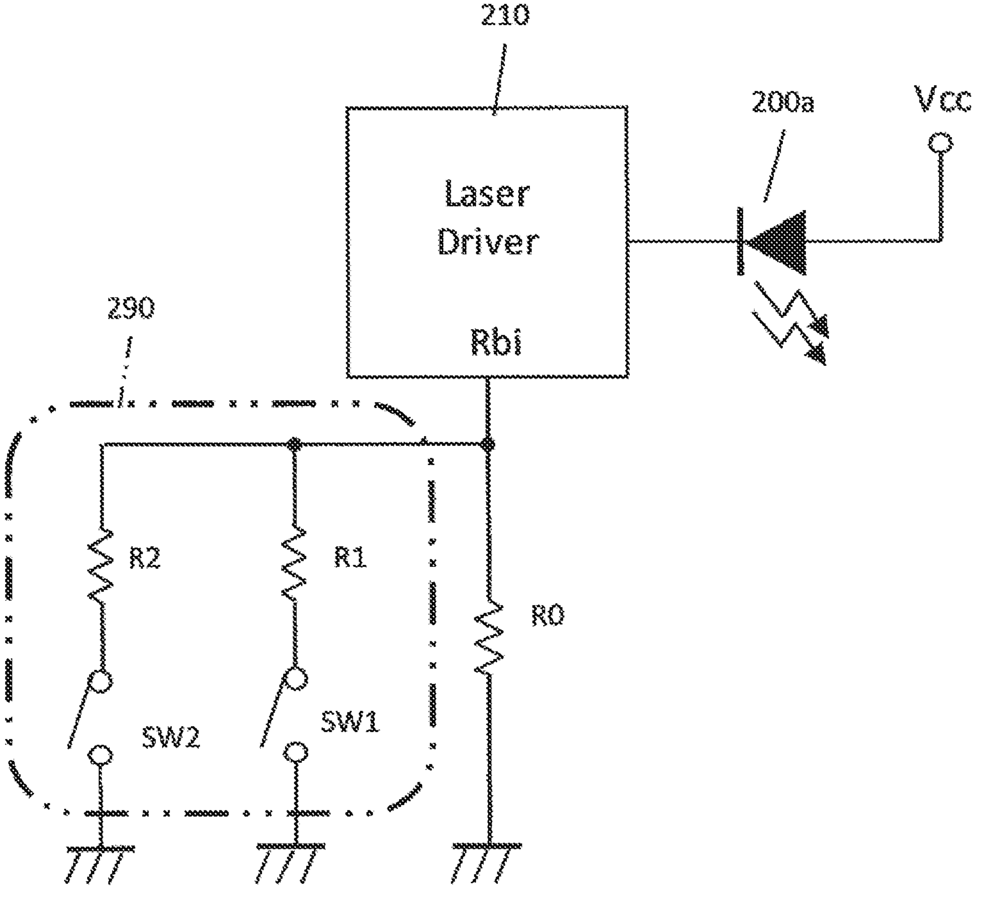
FIG. 7 illustrates a bias current control circuit of a first example.

FIG. 7 is circuit diagram illustrating the bias current control circuit 290 according to a first example. As illustrated in FIG. 7, the bias current control circuit 290 according to the first example is provided with multiple bias current setting resistors in the laser driver 210 to change the resistance value by turning on and off the resistors and control the bias current to be set to a setting value.

Specifically, setting resistors R1 and R2 are connected in parallel to the connection terminal Rbi of the resistor R0 that defines the bias current of the laser driver 210 through switches SW1 and SW2, respectively. The resistors R1 and R2 are switched on and off by switches SW1 and SW2 to vary the resistance (resistance value) connected to the connection terminal Rbi to control the bias current to be set to a setting value.

In such a case, the resistance value connected connection terminal Rbi is switched by turning on and off the switches SW1 and SW2 depending on the magnitude of the offset (Voffset), as described below, both the required amount of offset and the resolution when the target light quantity is large can be ensured.

Turning off SW1 and SW2: the resistance value is R0, SW1 is turned on and SW2 is turned off: the resistance value is R0×R1/(R0+R1), SW1 is turned off and SW2 is turned on: the resistance value is R0×R2/(R0+R2), SW1 is turned on, SW2 is turned on: the resistance value is R0×R1×R2/(R1×R2+R0×R2+R0×R1).

Note that the resistors are not limited to two, R1 and R2, but can be one or three or more. Alternatively, the resistance value can be set precisely by switching the resistor, but it is not limited to this; variable resistors can also be installed.

Figure 8:
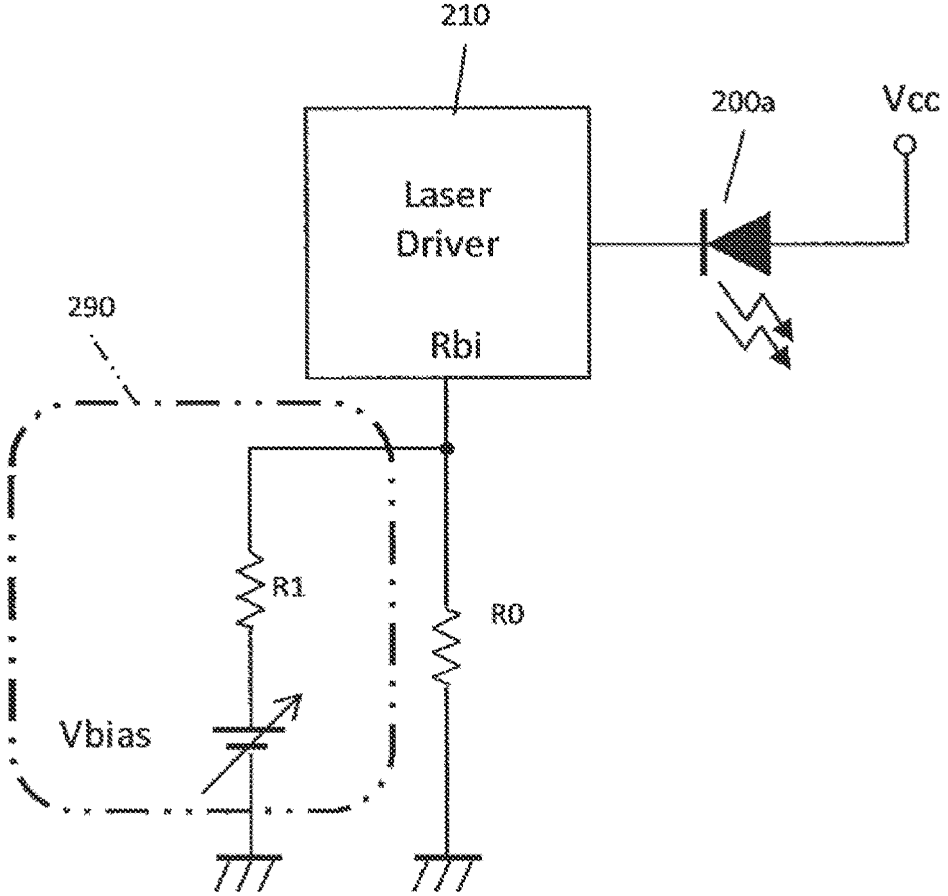
FIG. 8 illustrates a bias current control circuit of a second example.

FIG. 8 is circuit diagram illustrating the bias current control circuit 290 according to a second example. As illustrated in FIG. 8, when the connection terminal Rbi of the bias current control circuit 290 according to the second example connected to the bias current setting resistor R0 of the laser driver is of a constant voltage source, the bias current control circuit 290 controls the bias current to a setting value by connecting in parallel a variable voltage source Vbias to the connection terminal Rbi and varying the voltage applied to the connection terminal Rbi. Note that R1 denotes an adjusting resistor.

In such a case, the voltage applied from the variable voltage source Vbias to the connection terminal Rbi is varied to vary the bias current, and thereby vary the bias current assist amount. Since the switching is not stepwise by turning the switches on and off as in the first example, the voltage can be switched smoothly to select the appropriate voltage. The bias current can be controllable when the bias current setter is a constant voltage source.

The determination of the setting value of the bias current of the laser driver in accordance with the laser or lens characteristics will now be explained.

Figure 9:
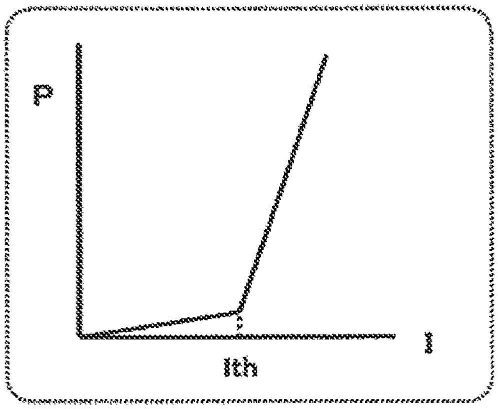
FIG. 9 is a graph illustrating the characteristics of a laser light emitting element.

FIG. 9 is a graph illustrating the characteristics of the semiconductor laser element used for the laser light emitting element of the laser light emitter 200*a*.

The relationship between the current (forward current) I flowing and the optical output P of the semiconductor laser element is illustrated in FIG. 9.

As illustrated in FIG. 9, when the current I is applied gradually, the semiconductor laser element shines gradually, but at first the emitted light is not a laser beam but light emitting diode (LED) light. However, the optical output suddenly increases at a certain point, and laser oscillation begins. This current at which laser oscillation begins is referred to as the threshold current Ith. The change in the optical output P with respect to the current I after the threshold current Ith is exceeded is extremely rapid, and the rate of change of the optical output P with respect to the current I is referred to as the differential efficiency.

Even if semiconductor laser elements are designed identically, variations in materials and various conditions in the manufacturing process result in different characteristics such as the threshold current and the differential efficiency.

Figure 10:
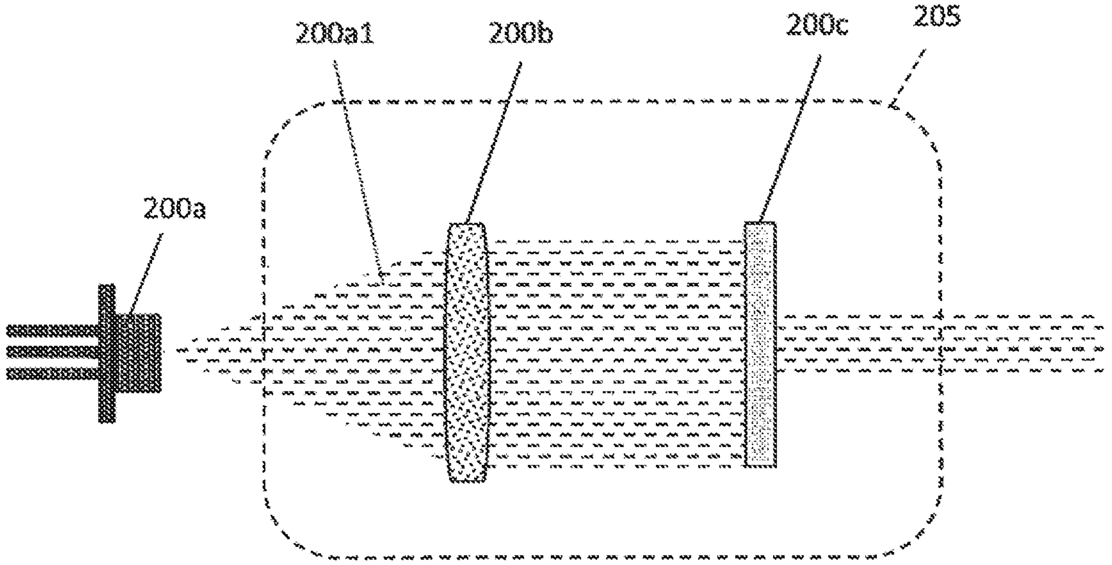
FIG. 10 is a diagram illustrating lens transmittance variation.

FIG. 10 illustrates the variation in lens transmittance in the laser light emitter 200*a*. One of the main reasons for variation in the lens transmittance is variation in the radiation angles (horizontal/vertical) of the semiconductor laser element.

As illustrated in FIG. 10, the laser beam (200*a*1) output from the laser light emitter 200*a*, which includes a semiconductor laser element, is converted into collimated light by a collimator lens 200*b* of an entrance unit 205 and is narrowed down to a predetermined light quantity at the aperture 200*c*.

In general, as a result of variation in the radiation angles (horizontal/vertical) of the semiconductor laser element, the amount of laser light that can be extracted after the aperture 200*c* of the entrance unit is narrows the laser light. Other factors include misalignment of the central axis between the semiconductor laser element and the entrance unit 205 and variations in the reflectance of the mirrors in the optical scanning device.

FIG. 11 illustrates an image of the operation of a semiconductor laser element. FIG. 11A illustrates the case where the offset becomes large, FIG. 11B illustrates the case where the offset becomes small, FIGS. 11C and 11D illustrate correction images.

Figure 11A:
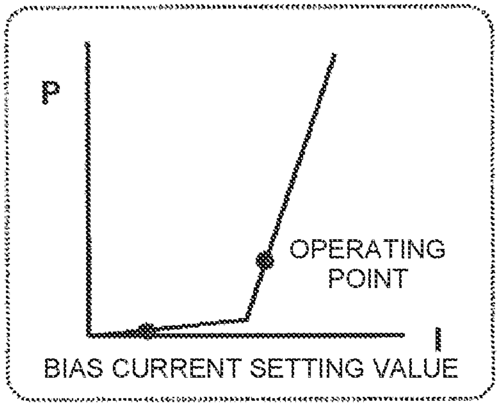
FIGS. 11A to 11D are diagrams illustrating the operation image of the laser light emitting element, where

When the characteristics of the semiconductor laser element are as illustrated in FIG. 11A in which the threshold current Ith is large, the differential efficiency is large, and the laser light quantity is small, the offset amount (Voffset) that should be secured is larger.

Figure 11B:
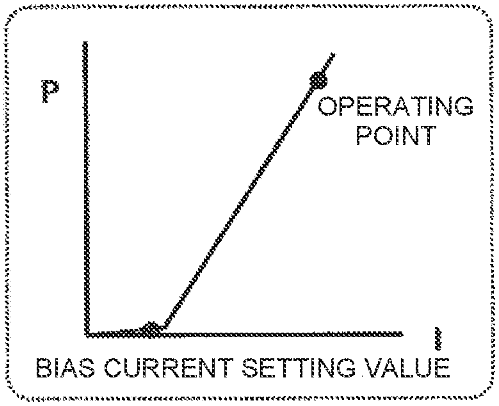

When the characteristics of the semiconductor laser element are as illustrated in FIG. 11B in which the threshold current Ith is small, the differential efficiency is small, and the laser light quantity is large, the offset amount (Voffset) is small, and the resolution becomes a problem.

Figure 11C:
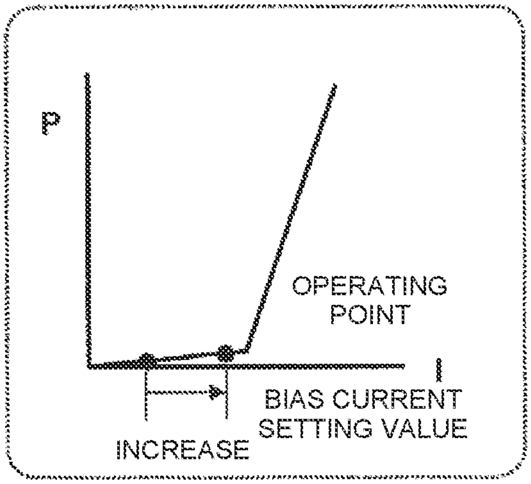
Figure 11D:
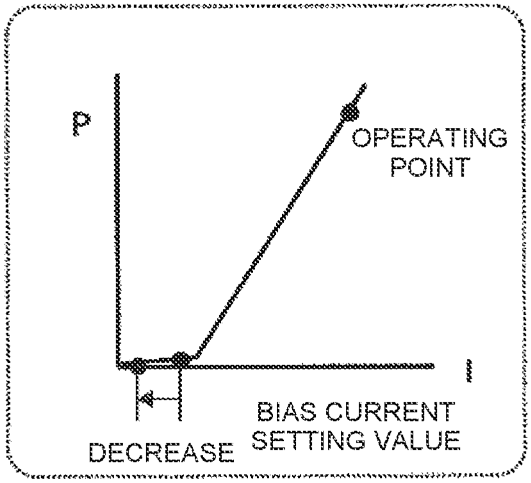

Thus, in the bias current setter 250 of the embodiment, when the offset amount is large as in FIG. 11A, the bias current setting value is increased as illustrated in FIG. 11C. When the offset amount is small as in FIG. 11B, the bias current setting value is reduced as illustrated in FIG. 11D.

Figure 12:
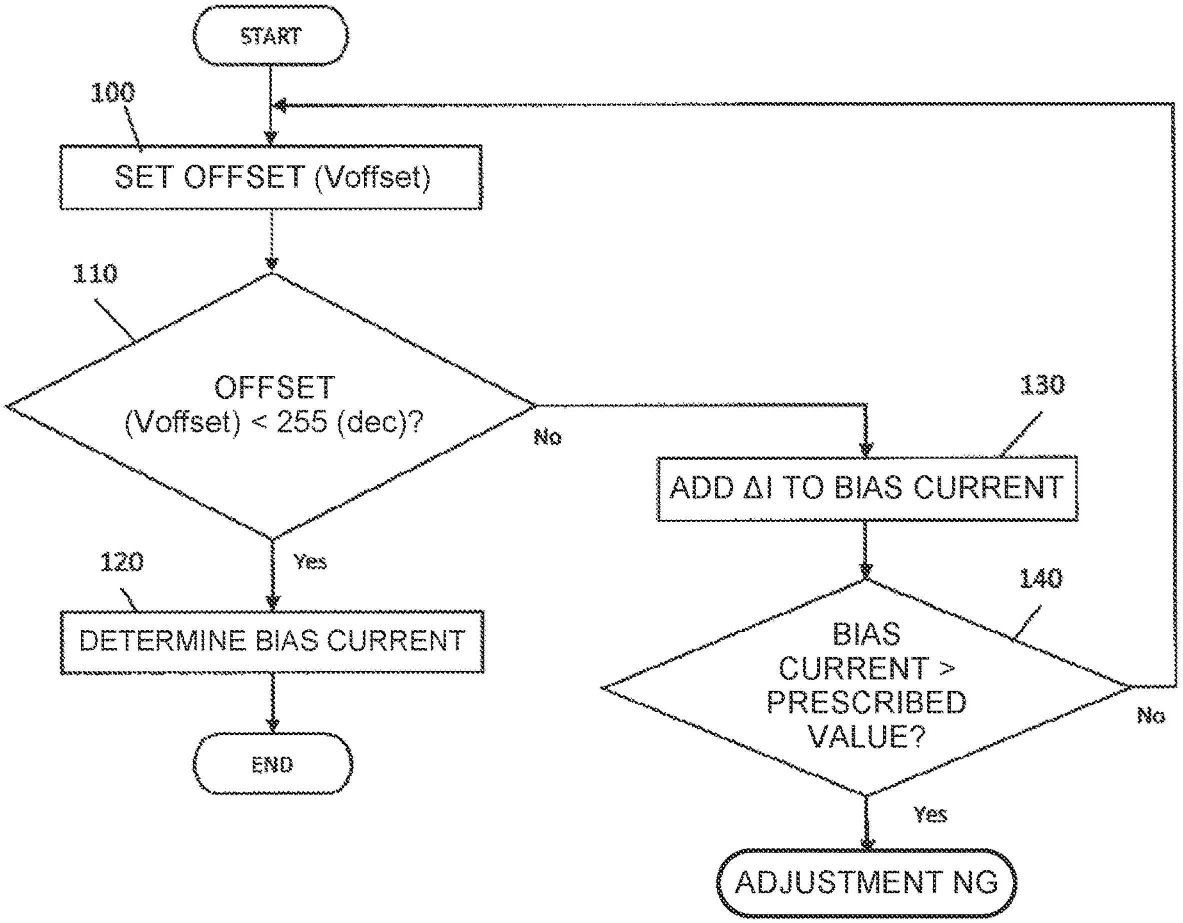
FIG. 12 is a flowchart of an embodiment.

FIG. 12 is a flowchart for determining the bias current setting value according to the embodiment. FIG. 4 is an explanatory diagram of an example of an offset value table. Hereinafter, step 100 is denoted just as "S100," and the subsequent steps are also denoted in the same manner.

First, the offset amount is set (S100), as illustrated in FIG. 12. The offset amount (Voffset) is determined (set) in response to the sub-scanning reference voltage signal (Vref) as in the table in FIG. 4.

Next, it determines whether or not the offset amount (Voffset) is smaller than a predetermined amount, for example, 255 (dec) (S110). If the offset amount is smaller than a predetermined amount (S110: Yes), the bias current is determined to be the current one (S120), and the process ends.

In contrast, if the offset amount is equal to or greater than the predetermined amount (S110: No), the bias current is increased by ΔI to obtain the setting value (S130). it is determined whether or not the obtained bias current setting value is greater than the specified value for the semiconductor laser element (S140). If the bias current is greater than the specified value (S140: Yes), the bias current setting value is not good (NG) and the adjustment is set to NG. If the bias current is equal to or smaller than the specified value (S140: No), the process returns to S100.

The case will be described in which the laser light emitter 200*a* is a multibeam laser light emitter in which the laser light emitter 200*a* includes a plurality of laser light emitting elements that emit laser beams.

Figure 13A:
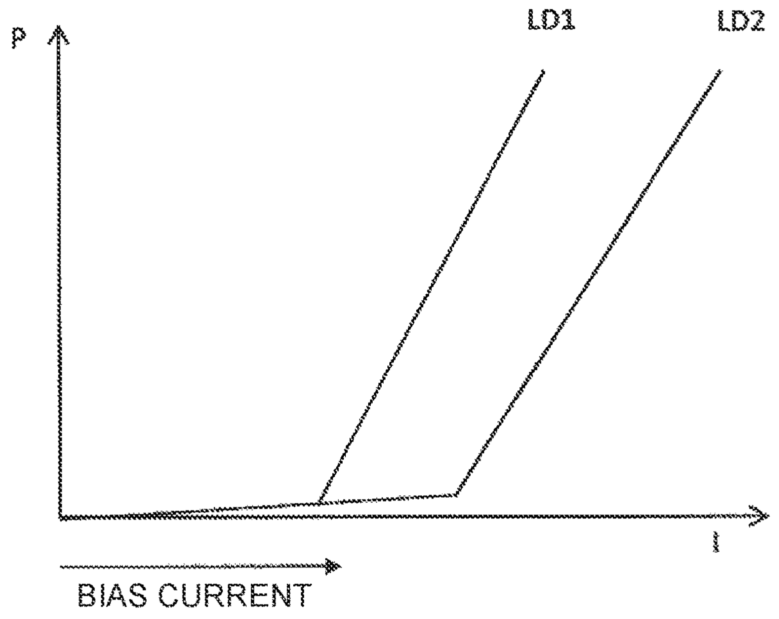
FIGS. 13A and 13B illustrate the bias current versus the offset for a multibeam laser.
Figure 13B:
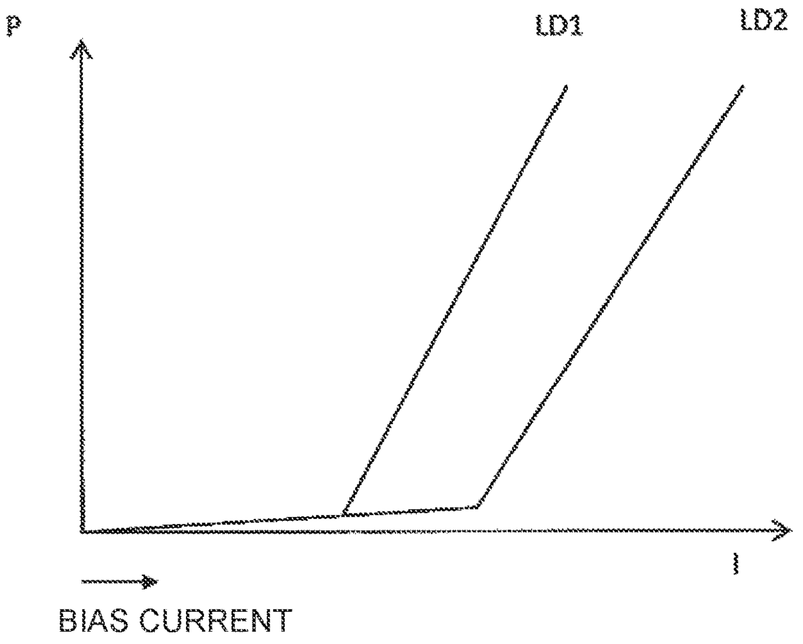
Figure 14:
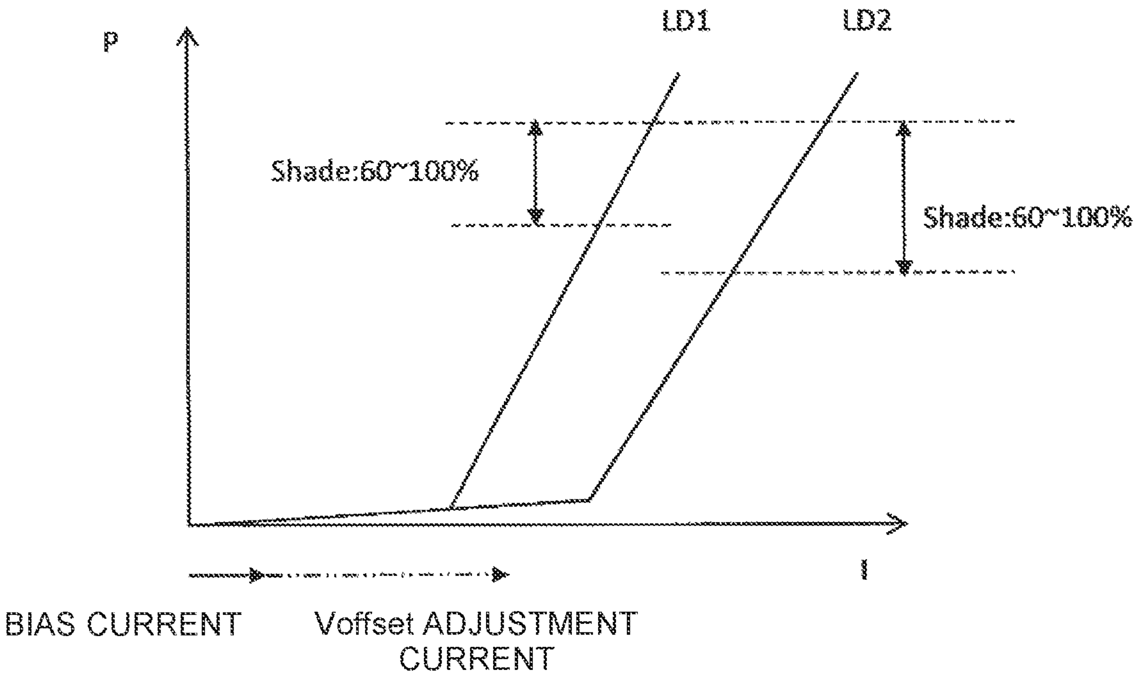
FIG. 14 illustrates the setting of the offset for a multibeam laser.

FIGS. 13A and 13B illustrate the bias current versus the offset for a multibeam laser. FIG. 14 illustrates the setting of the offset amount for the multibeam laser.

In the multi-beam laser, a common bias current is set for multiple laser elements. Keeping the bias current as close to the threshold current as possible can lower the required offset amount. However, since the threshold currents of the multiple semiconductor laser elements vary between beams, the bias current setting value cannot be set unnecessarily close to the threshold current.

As illustrated in FIG. 13A, in the case where the multibeam laser light emitter includes, for example, two semiconductor laser elements (laser light emitting elements) LD1 and LD2 having different characteristics, and the bias current is greater than that of the semiconductor laser element LD1 having the smaller threshold, the bias current may exceed the threshold of semiconductor laser element LD1. Thus, with the bias current exceeding the threshold, the light quantity is likely to differ between beams at a low light quantity command. In addition, laser oscillation may occur due to individual variation and temperature variation in the threshold current.

In contrast, as illustrated in FIG. 13B, when the bias current of the multibeam semiconductor laser elements LD1 and LD2 is set smaller than that of the LD1 having the smallest threshold, the semiconductor laser elements LD1 and LD2 both operate normally.

Thus, for the multibeam laser, it is preferable to set a bias current in common to the multiple laser light emitting elements, and to set the bias current smaller than the threshold current of the laser light emitting element having the smallest threshold current among the laser light emitting elements.

It is preferable that the bias current is set so as to secure a margin corresponding to the individual variation and temperature variation in the laser light emitting elements.

FIG. 14 illustrates the setting of the offset amount for the multibeam laser.

In the case where the laser light emitter 200*a* includes a multibeam laser light emitter, the laser driver controller 270 preferably sets a signal of an offset value in common to the multiple laser light emitters when a shading correction signal (Vshade) for shading correction of the laser light scanning the object is set in the laser driver 210 for each laser light emitting element of the multibeam laser light emitter 200*a*.

However, the bias current and offset value signal (Voffset) is set in common, but the shading correction value signal (Vshade) is different for each laser light emitting element. In FIG. 14, by setting the shading correction value signal (Vshade) of the laser light emitting elements LD1 and LD2 to different settings, the light quantity can be adjusted to a target light quantity.

If the offset value signal (Voffset) is set in common, the circuit scale and the ROM capacity can be reduced. There is an advantage in that the jig adjustment time of the laser light emitting element is not increased.

1.5 Operation and Effect

The optical scanning device and the image forming apparatus of the embodiment presumes that offset value signal (Voffset) linked with the target light quantity signal (reference voltage signal (Vref)) of the laser driver controller 270 at the time of APC control is combined with the shading correction value signal (Vshade).

Since the offset is made in accordance with the target light quantity, it is necessary to secure the necessary offset amount in consideration of the variation of the laser characteristics (threshold current, differential efficiency) and the lens transmittance. If the secured offset amount is large, the resolution of the offset is insufficient when the target light quantity is large, and there is a possibility of deviation of the target light quantity. When the bias current is brought close to the threshold current to reduce the required offset amount, the following problems arise.

- There is a possibility that the bias current exceeds the threshold current and light is constantly emitted due to the individual variation and temperature variation of the laser light emitting elements.
- When the bias current of the multibeam laser is set in common to all beams, there is a possibility that a laser oscillation beam is generated due to variation in the threshold current.
- When offset adjustment is performed for each beam with a multibeam laser configuration, the circuit scale and the ROM capacity are increased, and the jig adjustment time is also increased.

Feature 1

In contrast, in the embodiment, as illustrated in FIGS. 3 to 12, in an optical scanning device and an image forming apparatus using a laser driver in which an excess of a current over a bias current increases or decreases in proportion to an analog input signal, a bias current is set in accordance with the laser characteristics (threshold current, differential efficiency) and the lens transmittance. This achieves the following effects.

- The required offset amount is secured.
- The resolution is secured for when the target light quantity is large, and no deviation in the target light quantity occurs.
- The bias current does not exceed the threshold current due to individual variation and temperature variation in the threshold current, and constant laser oscillation does not occur.

Feature 2

Feature 2 is achieved by providing, to the configuration of Feature 1, a multibeam laser bias current setting that is common to all beams and that is smaller than that of a beam with the smallest threshold current, as illustrated in FIG. 13. This achieves the following effects.

- The bias current setting does not cause the laser oscillation.
- The jig adjustment time does not increase.

Feature 3

It is preferred that a margin corresponding to the individual variation and temperature variation in the laser light emitting elements be secured in the configuration of Feature 2 based on FIG. 13. This is Feature 3.

Setting Example

Minimum value of threshold current at a normal temperature of 25° C.: if the temperature is lowered (by 5° C.) at 3 (mA), the minimum value lowers by 0.5 (mA). Based on the above, the value is set to 2.0 (mA), taking into account the margin for individual variation and temperature variation. The following effects are achieved by taking this margin into account.

Individual variation does not cause the threshold current to be exceeded and does not cause constant laser oscillation.

Temperature variation does not cause the threshold current to be exceeded and does not cause constant laser oscillation.

Feature 4

An optical scanning device and an image forming apparatus using a laser driver in which an excess of a current over a bias current increases or decreases in proportion to an analog input signal has Feature 4 in which an offset amount of a multi-beam laser is set to be common to all beams, as illustrated in FIG. 14. This achieves the following effects.

The circuit scale and the ROM capacity can be reduced.

The jig adjustment time does not increase.

Although the embodiments have been described above, it should be understood that the specific configurations are not limited to the embodiments, and design variation or the like within a range not departing from the gist of the invention are also included in the scope of the claims.

Furthermore, in the embodiments, the program which can operate in each device is a program that controls a CPU or the like so as to realize the functions of the embodiments described above (a program that causes a computer to function). The information handled by these devices is temporarily stored in a transitory storage device (e.g., RAM) during the processing, then stored in various ROM or HDD storage devices, and read, modified and written by the CPU as necessary.

Here, the recording medium for storing the program may be a non-transitory recording medium such as a semiconductor medium (e.g., a ROM, a non-volatile memory card, etc.), an optical recording medium/magnetooptical recording medium (e.g., digital versatile disc (DVD), magnetooptical disc (MO), mini disc (MD), compact disc (CD), Blue-ray disc (BD), etc.), magnetic recording media (e.g., magnetic tape, flexible disk, etc.), or the like.

Not only are the functions of the above-described embodiments realized by executing the loaded program, but also the functions of the present disclosure may be realized by processing the program based on the instructions of the program along with an operating system, another application program, and the like.

When the program is distributed in the market, it can be distributed by storing the program in a portable storage device or transferred to a server computer connected via a network such as the Internet. In this case, the storage device of the server computer is of course covered by the present invention.

In addition, part or all of the devices in the above-described embodiments may be realized as a large scale integration (LSI), which is typically an integrated circuit. Each functional block of each device may be individually integrated into each chip, or may be partially or fully integrated into a chip. The integrated circuit method is not limited to LSI, but can be realized by dedicated circuits or general-purpose processors. In addition, when the progress of the semiconductor technology can replace LSI with a new technology of integrated circuits, it is of course possible to use such a new technology for the present invention.

What is claimed is:

1. An optical scanning device comprising:

a laser driver that controls a laser light emitter to increase or decrease an excess of a current over a bias current in response to an analog signal input to the laser driver;

an optical scanner to scan a surface of an object with laser light emitted from the laser light emitter;

a light quantity detector to detect a quantity of light of the laser light;

a laser driver controller to perform a stationary light quantity control in which the quantity of light of the laser light is controlled to be a target light quantity every time the optical scanner performs a line scanning;

a storage to store an offset adjusting table in which the target light quantity is associated with an offset value of the analog signal input to the laser light emitter;

an offset value determiner that determines the offset value associated with the target light quantity by using the offset adjusting table, a bias current setter that determines a bias current control value in such a manner that when the determined offset value is smaller than a predetermined value, a setting value of a present bias current is maintained, and when the determined offset value is equal to or greater than the predetermined value, a predetermined current is added to the setting value; and a bias current controller that controls the bias current based on the bias current control value received from the bias current setter.

2. The optical scanning device according to claim 1, wherein the bias current controller controls the bias current by varying a resistance value.

3. The optical scanning device according to claim 1, wherein when a terminal of the bias current setter connected to a bias current setting resistor of the laser driver is of a constant voltage source, the bias current controller further controls the bias current by varying a voltage to be applied to the terminal.

4. The optical scanning device according to claim 1, wherein:

the laser light emitter comprises a multibeam laser light emitter including a plurality of laser light emitting elements emitting laser beams, and the setting value of the bias current is set in common for the plurality of laser light emitting elements and is set smaller than a threshold current of a laser light emitting element, among the plurality of laser light emitting elements, which has a smallest threshold current.

5. The optical scanning device according to claim 4, wherein the bias current is set to secure a margin corresponding to individual variation and temperature variation in the plurality of laser light emitting elements.

6. An image forming apparatus comprising:

the optical scanning device according to claim 1;

an image carrier having a surface on which an electrostatic latent image is formed by scanning a laser beam emitted from the laser light emitter; and a developing section that develops the electrostatic latent image formed on the surface of the image carrier.

7. A method of controlling an optical scanning device including a laser driver that controls a laser light emitter to increase or decrease an excess of a current over a bias current in response to an analog signal input to the laser driver, the method comprising:

scanning a surface of an object with laser light emitted from the laser light emitter;

detecting a quantity of light of the laser light;

performing a stationary light quantity control in which the quantity of light of the laser light is controlled to be a target light quantity every time a line scanning is performed;

storing an offset adjusting table in which the target light quantity is associated with an offset value of the analog signal input to the laser light emitter;

determining the offset value associated with the target light quantity by using the offset adjusting table;

determining a bias current control value in such a manner that when the determined offset value is smaller than a predetermined value, a setting value of a present bias current is maintained, and when the determined offset value is equal to or greater than the predetermined value, a predetermined current is added to the setting value; and controlling the bias current based on the bias current control value.

* * * * *